(12) United States Patent
Piniecki

(10) Patent No.: US 6,740,157 B2
(45) Date of Patent: May 25, 2004

(54) METHOD FOR CEMENT CLINKER PRODUCTION USING VITRIFIED SLAG

(75) Inventor: Ronald Piniecki, Lebanon, IN (US)

(73) Assignee: Lone Star Industries, Inc., Indianapolis, IN (US)

( * ) Notice: Subject to any disclaimer, the term of this patent is extended or adjusted under 35 U.S.C. 154(b) by 20 days.

(21) Appl. No.: 10/188,166

(22) Filed: Jul. 2, 2002

(65) Prior Publication Data

US 2003/0084823 A1 May 8, 2003

Related U.S. Application Data

(60) Provisional application No. 60/335,205, filed on Nov. 2, 2001.

(51) Int. Cl.$^7$ .............................. C04B 7/14; C04B 7/36
(52) U.S. Cl. ................. 106/739; 106/745; 106/767
(58) Field of Search .............................. 106/739, 745, 106/767

(56) References Cited

U.S. PATENT DOCUMENTS

| | | | |
|---|---|---|---|
| 2,600,515 | A | 6/1952 | Mooser |
| 4,054,464 | A | 10/1977 | Thorn, Jr. et al. |
| 4,174,974 | A | 11/1979 | Fondriest |
| 4,678,514 | A | 7/1987 | Deyhle et al. |
| 5,084,102 | A | 1/1992 | Brouns et al. |
| 5,421,880 | A | 6/1995 | Young |
| 5,494,515 | A | 2/1996 | Young |
| 5,735,947 | A | 4/1998 | Hopkins |
| 5,968,258 | A | 10/1999 | Krofchak |
| 5,976,243 | A | 11/1999 | Oates et al. |
| 6,033,467 | A | 3/2000 | Krofchak |
| 6,109,913 | A | 8/2000 | Young |

OTHER PUBLICATIONS

Werner, Orville R. et al., ACI 226.1R 87, *Ground Granulated Blast–Furnace Slag as a Cementitious Constituent in Concrete* © 1987 American Concrete Institute.

C 989–89, *Standard Specification for Ground Granulated Blast–Furnace Slag for Use in Concrete and Mortars*, no date available.

Maslehuddin et al. *Corrosion of Reinforcing Steel in Concrete Containing Slag of Pozzolans*, 1990, pp. 24–31.

Department of the Army Corps of Engineers, Office of the Chief Engineers, Engineering and Design, *Standard Practice for Concrete*, Sep. 25, 1985, pp. 2–2 to 2–5 and 2–10.

Douglas et al., *Characterization of Ground Granulated Blast–Furnace Slags and Fly Ashes and Their Hydration in Portland Cement Blends.*, 1990, pp. 38–46.

Sarkar et al., *Synergistic Roles of Slag and Silica Fume in Very High–Strength Concrete.*, 1990, pp. 32–37.

Cowan, K.M. et al. SPE 24575, *Conversion of Drilling Fluids to Cements with Blast Furnace Slag: Performance Properties and Applications for Well Cementing.*, ©1992, Society of Petroleum Engineers, Inc.

Matyas, A.G., *Utilization of steelmaking slag*, Iron and Steel Engineer, Aug. 1978, pp. 29–30.

Solomon, Cheryl, *Slag–Iron and Steel*, U.S. Department of the Interior Bureau of Mines, 1992, pp. 1–15.

*Primary Examiner*—Paul Marcantoni
(74) *Attorney, Agent, or Firm*—Maginot, Moore & Beck

(57) ABSTRACT

A method for the production of cement clinker comprises the introduction of vitrified slag into the feedstock stream prior to the clinkering zone. The addition of vitrified slag can increase the clinker output rates and/or reduce the energy requirements for maintaining the kiln temperatures. In one embodiment, the vitrified slag is a vitrified blast furnace slag.

15 Claims, No Drawings

METHOD FOR CEMENT CLINKER PRODUCTION USING VITRIFIED SLAG

CROSS-REFERENCE TO RELATED APPLICATION

This application derives priority from U.S. provisional patent application Ser. No. 60/335,205, filed on Nov. 2, 2001, having the same title and in the name of the same inventor.

BACKGROUND OF THE INVENTION

This invention relates in general to the manufacture of cement clinker, particularly in rotary kilns. More specifically, the invention relates to the introduction of slag into the kiln to enhance the clinker production process.

The details of a typical cement pyroprocessing operation are well known. One typical process utilizes a rotary kiln into which cement raw materials, such as limestone, clay and sand, are introduced. The kiln is inclined so that the raw materials progress along the length of the kiln from input to output end. The inclined kiln is heated at or near the output end to create a number of operating zones within the kiln or kiln system. For instance, at the input end, a pre-calcining zone can be provided that has a gas temperature of about 1000° F. (538° C.). The kiln gas temperature can be increased to about 1600° F. (871° C.) in a calcining zone where the $CaCO_3$ in the raw materials is decomposed.

The calcined material then passes to a clinkering zone where it faces the burning zone temperature inside the kiln, approximately 2732° F. (1500° C.). It is in this zone that the feedstock is converted into the typical cement compounds, such as tricalcium silicate, dicalcium silicate, tricalcium aluminate, etc. A cooling zone follows at the output of the kiln.

A variety of materials have been added to the cementious compositions in the production of cement clinker. The use of slag in the production of cement dates back to 1774 when a mortar was made with ground blast-furnace slag and slaked lime. The first commercial use of blended slag cements arose in Europe in the mid-1800's. A current example of a blended cement using a blast-furnace slag is found in U.S. Pat. No. 5,976,243. Many slags are well suited for use in clinker production because the slags can include many chemical constituents common to the cement chemical compounds. In addition, many slags can be added to the cement clinker without any deleterious effects to the cement kiln or to the clinker product. Thus, the slag, which is essentially a waste material from metal production, takes on value and can reduce the quantity of more expensive feedstock or virgin feedstock required in the clinker production.

The use of slag as a feedstock in the pyroprocessing of cement, including Portland cement, is also known. For example, U.S. Pat. No. 2,600,515, issued in 1952, discloses introducing blast-furnace slag directly into the flame in order to avoid problems associated with the fusibility of slag. The patent of Young, U.S. Pat. No. 5,421,880, describes introducing a steel slag at the feed end of the kiln to combine with the feedstock material, and then heating the mixture to form cement clinkers. This patent, and a subsequent U.S. Pat. No. 5,494,515 to the same inventor, contemplate adding a crushed and screened air-cooled slag to the lime-containing feedstock material.

As might be appreciated from the materials being processed and the extreme temperatures being utilized, cement clinker product has significant energy requirements. The manufacture of cement is second only to power generation in fossil fuel consumption for heating the kilns. Moreover, the pyroprocessing yields significant emissions, with $CO_2$ emissions being the most prominent.

There remains a consistent need to improve the efficiency and yield of the cement clinker production process. It is desirable to optimize fuel usage and maximize clinker production.

SUMMARY OF THE INVENTION

In order to address these needs, the present invention contemplates a process in which vitrified slag material is used as feedstock at the feed end of a cement pyroprocessing operation. The vitrified slag material is combined with the lime-containing material, preferably at the feed end of the kiln, but at least prior to the clinkering zone of the kiln. The lime-containing materials can be selected to yield any type of cement, such as Portland and other hydraulic cements.

In one embodiment, the slag material is pre-calcined. In another feature, the slag material is a substantially acrystalline blast furnace slag. The glassy slag can be combined with lime-containing feedstock and sweeteners depending upon the desired clinker chemistry. For example, in a specific embodiment the slag can be provided in a 1:3 ratio relative to the lime-containing feedstock. The slag can be provided in its vitrified state obtained from the metal smelting process, although optional pre-drying of the slag may improve overall performance in certain circumstances.

It is believed that the acrystalline high-energy state of the vitrified slag leads to an exothermic heat of formation of the pyroprocessing products $C_2S$ and $C_3S$. This exothermic phenomenon can lead to an optimization or a reduction in fuel consumption required to maintain acceptable temperatures within the kiln. Similarly, it is believed that the acrystalline high-energy state of the slag maximizes clinker production relative to the input feedstock.

One embodiment of the invention contemplates a method for the production of cement clinker in a heated rotary kiln having a feed end and a discharge end, the kiln having at least a clinkering zone between the feed end and the discharge end. In this embodiment, the method comprises the steps of: introducing a stream of feedstock material containing lime into the feed end of the kiln; introducing a vitrified slag into the kiln, preferably at or upstream of the clinkering zone; mixing the vitrified slag with the stream of feedstock material, preferably at or prior to the clinkering zone; and conveying the vitrified slag and feedstock material through the clinkering zone to the discharge end of the kiln.

In a specific embodiment, the vitrified slag is a vitrified blast furnace slag. The vitrified slag can have a glass content of at least 90% (ninety percent), and at least 75% (seventy-five percent) in certain embodiments. The vitrified slag can be pre-calcined before introduction into the kiln. In some embodiments, the vitrified slag is introduced at the feed end of the kiln, and can be mixed with the feedstock prior to introduction into the kiln. In other embodiments, the vitrified slag can be added at other points along the kiln provided that the vitrified slag passes through the clinkering zone with the feedstock. In a further aspect of the invention, the method includes the step of selecting the vitrified slag so that the chemistry of the vitrified slag is substantially similar to the desired chemistry of the cement clinker.

In another embodiment of the invention, a method is provided for the production of cement clinker in a heated rotary kiln having a feed end and a discharge end, the kiln having at least a clinkering zone at a predetermined clinkering temperature between the feed end and the discharge end. In this embodiment, the method can comprise the steps of: introducing a stream of feedstock material containing lime into the feed end of the kiln; heating the kiln from a heat source outside the kiln to produce the clinkering temperature in the clinkering zone; introducing a vitrified slag into the kiln upstream of the clinkering zone; mixing the vitrified slag with the stream of feedstock material prior to the clinkering zone; reducing the heat generated by the heat source in relation to the vitrified slag introduced into the kiln to maintain the predetermined clinkering temperature; and conveying the vitrified slag and feedstock material through the clinkering zone to the discharge end of the kiln.

DESCRIPTION OF THE PREFERRED EMBODIMENT

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one skilled in the art to which this invention pertains.

The present invention contemplates the addition of vitrified slag materials to lime-containing raw materials in a cement clinker production facility. More specifically, the production facility can be a known rotary kiln that is heated to define at least a clinkering zone. As is known in the art, the rotary kiln has a feed end and a discharge end, with a heat source exterior to the kiln being situated at the discharge end. The heat generated by the heat source is controlled to achieve an appropriate temperature distribution within the kiln. In particular, the heat source is controlled to achieve a predetermined clinkering temperature within the clinkering zone of the kiln.

In accordance with the present invention, the vitrified slag is combined with the raw materials or feedstock prior to the clinkering zone and preferably at the input end of the kiln. The slag material can be pre-calcined when provided to the kiln, and can be interground with the raw mix components either at the input to the kiln or through a raw mill.

The vitrified slag is preferably selected from a group of materials that most closely resembles the chemistry of the desired clinker. In one embodiment of the invention, the slag material is a vitrified blast furnace slag (VBFS). The VBFS can be of the type readily available as waste material from an iron production facility. This type of slag consists primarily of silica ($SiO_2$) and alumina ($Al_2O_3$) combined with calcium and magnesium oxides (CaO and MgO). Thus, the chemistry of the VBFS is very compatible with the chemistry of the typical lime-containing raw material used to produce cement clinker, and is equally compatible with the preferred chemistry of the resulting clinker.

A key aspect to the present invention is that the slag is vitrified, meaning substantially acrystalline or glassy. The vitrified blast furnace slag can be obtained by rapid cooling the slag, for example by water quenching, as it is removed from the blast furnace. In one embodiment of the invention, the glass content of the vitrified slag is 90–99%. In other embodiments, the glass content can be as low as 75% while still achieving most of the benefits of the present invention.

The VBFS can have a Ca-to-Si ratio of between 1.0:1 and 1.3:1. Often this ratio will require a proportioning of the typical feedstock raw material to achieve the desired clinker chemistry. For instance, it may be necessary to add a high-Ca sweetener to achieve the desired chemical relationships in the clinker production. Thus, in one example, the lime-containing raw material is a high-Ca limestone, on the order of 97.2% CaO. In this example, the limestone fines have a particle diameter of about ⅜ in. The ratio of sweetener to VBFS is preferably 3:1.

In one example embodying the invention, the VBFS was an aged granulated blast furnace slag. In this example, the VBFS was about 4 years old and had an LOI (loss on ignition) of about 12% and a moisture content of about 14%. In a typical case, a VBFS will have a moisture content of 8–10% and an LOI of 1% or less. Thus, in this specific example, it is believed that the VBFS endured a large degree of pre-hydration and recarbonation as the slag aged. However, it is believed that the moisture level is not significant in this example because most of the moisture was driven off in the raw mill prior to introduction into the rotary kiln.

In this same example, a moderate Ca content limestone was provided at the raw mill and fed to the kiln with the aged VBFS. The VBFS was added at a nominal rate of 3 tons/hour, or 72 tons/day, to maintain the $C_3S$ content in the resulting clinker at acceptable levels. The addition of this acrystalline VBFS resulted in an increase in clinker production rate by 24 tons/day, or about 1.3%. In addition, the amount of fuel required to operate the cement kiln at the requisite pyroprocessing temperatures was reduced by about 0.4 tons/hour, or about 3.2%. This reduction in fuel usage and increase in production rate can be combined to yield an implied production increase of about 4.5% (1.3%+3.2%). When compared to the 3.8% addition rate of VBFS to the raw material, every ton of slag added to the feedstock resulted in an implied productivity of 1.18 tons of new clinker production and/or reduced fuel usage.

In a second example, VBFS was added at variable rates depending upon the magnesium content of the raw feedstock. Over a one-month period, the VBFS was introduced at rates nominally ranging from 100 TPD (tons/day) to a peak of about 525 TPD, with no slag being added on ten days. The fuel consumption remained substantially constant during the one-month period. The raw material feed rate remained substantially constant throughout the test, being kept at the same level as prior to the introduction of the VBFS. Prior to the test, the kiln clinker production rate was nominally about 3636 TPD.

In this example, the clinker production rate rose dramatically over the month-long test and nearly every day when slag was added. When normalized over the test period, each ton of VBFS added to the raw feedstock resulted in 1.21 tons of additional clinker production. Thus, for the present example, the clinker production (Y) as a best-fit linear function of VBFS (X) can be represented by the following relationship: y=1.21 X+3636. However, over short time periods, the data may suggest non-linear characteristics between the addition of slag to clinker production increases. For instance, at lower slag TPD values, the clinker production increased by up to four times the slag TPD. At higher slag introduction rates, the clinker increase was at a multiplier of about 1.2.

As these examples demonstrate, the addition of vitrified slag having a composition compatible with clinker production, and particularly vitrified blast furnace slag, can increase ultimate clinker production beyond the rates that might otherwise be expected for the volume of slag added.

It is believed that the acrystalline nature of the VBFS improves the thermodynamics of the pyroprocessing operation, such as by an exothermic action within the kiln.

Thermodynamically, it is believed that the bulk of the energy locked within the acrystalline form of the vitrified slag can be realized in the exothermic heat of formation of $C_2S$ (−171 Kcal/Kg) and $C_3S$ (−126 Kcal/Kg). The present invention also leads to a reduction in $CO_2$, SOx and NOx production per ton of clinker produced. The reduction in $CO_2$ permits an increase in throughput with the same gas handling capabilities of the conventional rotary kiln. Thermal NOx can be reduced by reducing the flame temperature required in the burning zone, which can significantly reduce the oxidation of atmospheric $N_2$ within the kiln. Fuel NOx reduction can also be accomplished due to reduced fuel requirements.

In addition, it is believed that passing a vitrified slag through the kiln and incorporating it into the elemental structure of the clinker, transforms the slag into a much higher value material at minimal cost. Instead of discounting slag cement that is produced at an energy premium, the present invention yields a more valuable Portland cement product.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

What is claimed is:

1. A method for the production of cement clinker in a heated rotary kiln having a feed end and a discharge end, the kiln having at least a clinkering zone between the feed end and the discharge end, the method comprising the steps of:
    introducing a stream of feedstock material containing lime into the feed end of the kiln;
    providing a vitrified slag with the stream of feedstock material into the clinkering zone; and
    conveying the vitrified slag and feedstock material through the clinkering zone.

2. The method for the production of cement clinker according to claim 1, wherein the step of providing a vitrified slag includes introducing the vitrified slag into the kiln at or upstream of the clinkering zone.

3. The method for the production of cement clinker according to claim 1, wherein the step of providing a vitrified slag includes mixing the slag with the stream of feedstock prior to the clinkering zone.

4. The method for the production of cement clinker according to claim 1, wherein the vitrified slag is a vitrified blast furnace slag.

5. The method for the production of cement clinker according to claim 1, wherein the slag has a glass content of at least 90%.

6. The method for the production of cement clinker according to claim 5, wherein the slag has a glass content of at least 75%.

7. The method for the production of cement clinker according to claim 1, wherein the vitrified slag is pre-calcined before introduction into the kiln.

8. The method for the production of cement clinker according to claim 1, wherein the vitrified slag is introduced at the feed end of the kiln.

9. The method for the production of cement clinker according to claim 1, wherein the vitrified slag is mixed with the feedstock prior to introduction into the kiln.

10. The method for the production of cement clinker according to claim 1, further comprising the step of selecting the vitrified slag so that the chemistry of the vitrified slag is substantially similar to the chemistry of the cement clinker.

11. The method for the production of cement clinker according to claim 1, wherein the vitrified slag is provided in a ratio of one part vitrified slag to three parts feedstock.

12. A method for the production of cement clinker in a heated rotary kiln having a feed end and a discharge end, the kiln having at least a clinkering zone at a clinkering temperature between the feed end and the discharge end, the method comprising the steps of:
    introducing a stream of feedstock material containing lime into the feed end of the kiln;
    heating the kiln from a heat source outside the kiln to produce the clinkering temperature in the clinkering zone;
    providing a vitrified slag with the feedstock into the kiln at the clinkering zone;
    reducing the heat generated by the heat source in relation to the vitrified slag provided into the kiln to maintain the clinkering temperature; and
    conveying the vitrified slag and feedstock material through the clinkering zone.

13. The method for the production of cement clinker according to claim 12, wherein the step of providing a vitrified slag includes introducing the vitrified slag into the kiln at or upstream of the clinkering zone.

14. The method for the production of cement clinker according to claim 12, wherein the step of providing a vitrified slag includes mixing the slag with the stream of feedstock prior to the clinkering zone.

15. The method for the production of cement clinker according to claim 1, further comprising the step of selecting the vitrified slag so that the chemistry of the vitrified slag is substantially similar to the chemistry of the cement clinker.

* * * * *